United States Patent [19]

Wood

[11] 4,109,968
[45] Aug. 29, 1978

[54] TRACTOR-TRAILER BRAKE SYSTEM WITH IMPROVED MEANS FOR ASSURING APPLICATION OF TRAILER BRAKES CONCOMITANTLY WITH TRACTOR BRAKES

[75] Inventor: Leo A. Wood, Milwaukee, Wis.

[73] Assignee: Rollin L. Wood, Derby, Conn.; a part interest

[21] Appl. No.: 819,706

[22] Filed: Jul. 28, 1977

[51] Int. Cl.² .............................................. B60T 15/02
[52] U.S. Cl. ......................................... 303/7; 303/40; 303/47
[58] Field of Search ............................... 303/7, 40, 47

[56] References Cited

U.S. PATENT DOCUMENTS

| 2,985,488 | 5/1961 | Stelzer | 303/47 X |
|---|---|---|---|
| 3,497,268 | 2/1970 | Dobrikin | 303/7 |
| 3,747,992 | 7/1973 | Schnipke | 303/7 X |
| 3,819,238 | 6/1974 | Cermak | 303/47 |

*Primary Examiner*—Duane A. Reger
*Attorney, Agent, or Firm*—Ira Milton Jones & Associates

[57] ABSTRACT

A pneumatic tractor-trailer brake system by which application of the trailer brakes and the tractor brakes occurs simultaneously to guard against jack-knifing. This is accomplished by connecting the pressure chamber of the relay valve on the trailer and the adjacent end of the service line with the air pressure tank on the trailer by opening a normally closed solenoid-actuated valve as a consequence of initial depression of the brake pedal. Energization of the solenoid to open this valve results from closure of the energizing circuit for the stop light on the trailer. The resulting immediate response of the relay valve pressurizes the entire trailer brake system, including the service line, sufficiently to take up any slack in the trailer brakes no later than that occurs at the tractor brakes. At the instant the brakes begin to grip, a fluid pressure actuated electric switch opens the solenoid energizing circuit. The resulting reclosure of the valve commits the trailer brakes to application simultaneously with the tractor brakes in the customary way by continued depression of the brake pedal. For brake systems equipped with automatic anti-wheel-locking means that effects its control by reducing the pressure in the pressure chamber of the relay valve, a unidirectional flow restriction in the line leading to the fluid pressure actuated switch holds the switch open and thus prevents reopening of the solenoid-actuated valve.

3 Claims, 1 Drawing Figure

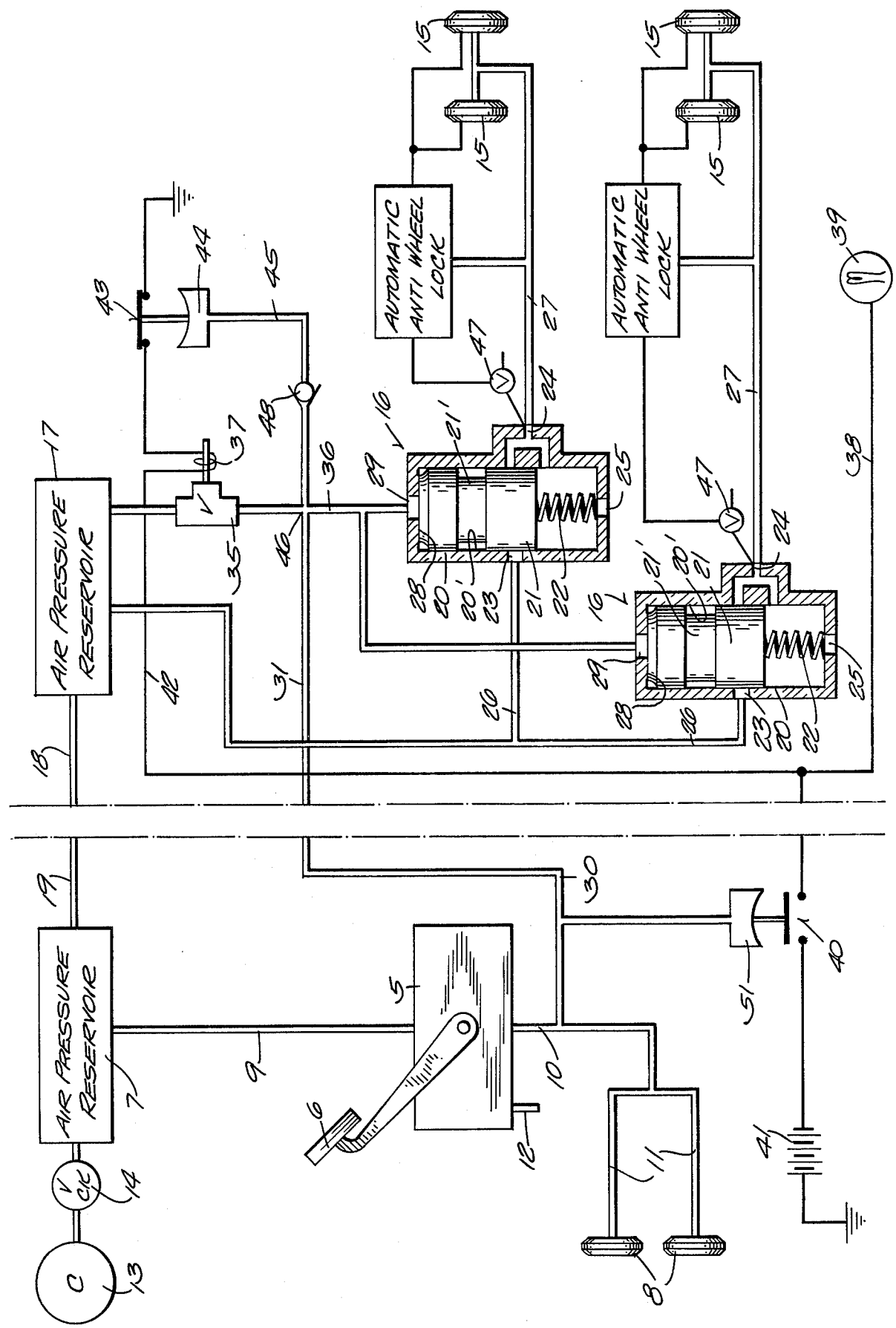

TRACTOR-TRAILER BRAKE SYSTEM WITH IMPROVED MEANS FOR ASSURING APPLICATION OF TRAILER BRAKES CONCOMITANTLY WITH TRACTOR BRAKES

This invention, like that of the now abandoned application Ser. No. 720,667, which was filed Sept. 7, 1976, relates to a tractor-trailer brake system and has as its purpose and object the elimination — for all practical purposes — of any time lag between the application of the trailer and tractor brakes.

The importance of eliminating this lag in the application of the trailer brakes has been recognized for some time. The Kelsey-Hayes owned Stelzer U.S. Pat. No. 2,941,844 and the Dobrikin U.S. Pat. No. 3,497,268, assigned to Berg Mfg. & Sales Co., which appear to be the most pertinent prior art bearing upon the patentability of this invention, explain the dire consequences of delayed energization of the trailer brakes. While the inventions disclosed in those patents may have been steps in the right direction, they do not and cannot meet the present day government prescribed safety standards. Although tractor manufacturers have succeeded in achieving tractor brake actuation within the short time prescribed by these standards, prior to this invention there was no way of matching trailer brake application to that of the tractor.

To illustrate, the brake systems of modern tractors bring the air pressure applied to the brake diaphragm from 0 to 60 PSI in as little as one tenth of a second, whereas it requires a full second to achieve the same pressure build-up in the brakes of many trailers in use today. With a 1 second brake application time, a trailer moving at 55 M.P.H. travels 80 feet before braking is realized, while the brakes of its tractor take effect in only 8 feet. Under those circumstances, jack-knifing is virtually inescapable.

By comparison, this invention enables the pressure on the trailer brake diaphragm to go from 0 to 60 P.S.I. in 0.15 to 0.30 seconds. More significantly, in 0.015 to 0.020 of a second the pressure rises to the 5 to 6 P.S.I. needed to charge the entire trailer brake system, including the full length of the service line. With the slack thus taken out of the trailer brake system, the trailer brakes and the tractor brakes are directly and equally responsive to the pressure the operator applies to the brake pedal.

Actual tests with truck and trailer units equipped with this invention have demonstrated a complete absence of any evidence of lag in the application of the trailer brakes. Nor did those tests reveal any wheel lock-up problem. The brake system of the aforesaid patents and of other known less pertinent prior art, are utterly incapable of even remotely comparable performance.

As will be more fully described, with the present invention, initial depression of the brake pedal by the driver of the tractor is instantly accompanied by opening of a normally closed solenoid actuated valve which upon being opened, communicates the pressure chamber of the relay valve on the trailer, as well as the end of the service line connected thereto, with the air pressure tank on the trailer. With that communication established, the relay valve is activated and within 0.015 to 0.020 seconds after the brake pedal is initially depressed, the actuators of the trailer brakes are pressurized to 5 to 6 P.S.I. which is sufficient to take up the slack in those brakes. A most important aspect of the invention is that the entire length of the service line — from the tractor to the relay valve — is pressurized concomitantly with the pressure chamber of the relay valve. It is this achievement that enables the present invention to meet the requirements of present day government safety standards, while the brake systems of the prior art, and even that of the identified Dobrikin patent which undoubtedly comes closest to this invention, most definitely can not.

The relatively small pressure rise needed to take up the slack in the trailer brakes and to "prime" the service line for immediate action, is sufficient to — and does — actuate and open a fluid pressure responsive switch which controls energization of the solenoid of the solenoid-actuated valve. With the opening of that switch, the system is rendered directly responsive in the customary way to continued depression of the brake pedal. In this connection, the point in the system, with reference to the relay valve and the brake diaphragm at the wheels, is most important. That point must be between the normally closed solenoid actuated valve and the service port of the relay valve.

As will be explained hereinafter, the trailer brake system of this invention is entirely compatible with the now required automatic anti-wheel-locking controls by which the brake-applying pressure at any or certain of the brake diaphragms is bled off in consequence of the tendency of the wheel to lock; and to accommodate systems in which the anti-wheel-locking means effects its control by reducing the pressure in the pressure chamber of the relay, the invention includes means for restricting flow from the pressure responsive switch to assure against reopening of the solenoid-actuated valve.

With these observations and objectives in mind, the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

The accompanying drawing illustrates one complete example of the embodiment of the invention constructed according to the best mode so far devised for the practical application of the principles thereof, and in which:

The single FIGURE diagrammatically depicts the entire tractor-trailer brake system of this invention.

As will be readily apparent to anyone familiar with pneumatic tractor-trailer brake systems, much of the present system is conventional. Thus, as diagrammatically shown in the drawing, the tractor has the usual brake control valve 5 operated by a brake pedal 6 and operable upon depression of the pedal to effect increasingly greater communication between an air pressure reservoir 7 and the actuators 8 of the tractor brakes through lines 9, 10 and 11. Pressurizing the actuators 8, of course, applies the tractor brakes with a force depending upon the extent the brake pedal is depressed.

Return of the brake pedal to its undepressed condition, acting through the control valve 5, vents the brake actuators to atmosphere through an air exhaust 12.

A predetermined magnitude of air pressure is maintained in the reservoir 7 by a compressor 13 that is connected therewith through a check valve 14.

The conventional components of the trailer portion of the brake system are the customary brake actuators 15, one for each wheel, conventional relay valves 16, one for the wheels of one of the two rear axles and the other for the wheels of the other rear axle, and an air pressure reservoir 17. An air pressure supply line 18 leading from the reservoir 17 and coupled in the usual manner with a similar line 19, connects the reservoirs 7 and 17.

In actual practice, the relay valves 16 are often quite sophisticated, but functionally they are essentially no different from those diagrammatically illustrated, wherein a housing 20 defines a cylinder 20' in which a spool-type piston 21 is slidably mounted and biased by a spring 22 to a position at which an inlet port 23 is closed and an outlet port 24 is communicated with atmosphere through an exhaust port 25 in the housing. The inlet port 23 of both relay valves is communicated with the air pressure reservoir 17 through a line 26, and the outlet port 24 thereof is communicated with its associated brake actuators 15 through lines 27.

The housing and piston coact to provide a pressure chamber 28 having a service intake port 29 that is communicated with the control valve 5 on the tractor through a service line having a tractor component 30 and a trailer component 31 coupled together in the customary way.

Conventionally — that is, without the benefit of this invention — depression of the brake pedal pressurizes the brake actuators 8 of the tractor brakes and after a time interval determined by friction in the inevitably long service line 30–31, also pressurizes the pressure chamber 28 of each of the relay valves. The resulting response of the piston 21 to the rise in pressure in the pressure chamber 28 communicates the inlet port 23 with the outlet port 24 and disconnects the latter from the exhaust port 25. This response of the relay valves to the pressure delivered thereto by the service line thus connects the brake actuators 15 with the air pressure reservoir 17 through lines 26 and 27 and, in the diagrammatic illustration of the relay valves, through that portion of the cylinder 20' in which the waist 21' of the spool-shaped piston is located.

While the resulting response of the brake actuators 15 will apply the trailer brakes, the time of that application — in the conventional system — due to the aforesaid inevitable delay in the manifestation of pressure at the trailer end of the service line which is connected to the relay valves, will lag behind the application of the tractor brakes. Since lag in the application of the trailer brakes constitutes a potential danger of jack-knifing, safety considerations demand the elimination of any lag whatsoever.

The present invention meets that demand in an extremely simple and entirely reliable way. It is accomplished by communicating the pressure chamber 28 of the relay valves 16 with the air pressure reservoir 17 by opening of a normally closed solenoid-actuated valve 35 connected in a line 36 that leads from the reservoir 17 and is unrestrictedly connected to the intake or service port 29 of both relay valves; and by energizing the solenoid 37 of that valve by an electric circuit that is closed concomitantly with initial depression of the brake pedal 6. Most conveniently, that electric circuit utilizes the existing lead 38 that connects the stop light 39 on the trailer with the customary brake-pedal-responsive stop light switch 40 on the tractor, it being understood that the tractor and trailer components of that lead are suitably coupled and that the stop light switch is connected with a battery 41 or other source of current on the tractor.

A jumper 42 connected to the lead 38 brings current to the "hot" terminal of the solenoid 37 the instant the stop light circuit is energized. The other terminal of the solenoid is grounded through a normally closed fluid pressure responsive switch 43 which may be of any suitable type, many of which are commercially available. The pressure responsive actuators of these switches are adjustable to trip at any selected pressure.

With the opening of the valve 35 by energization of its solenoid, the pressure chamber 28 in the relay valves and the adjacent end of the service line 30, 31 are connected with the air pressure reservoir 17. Instantly the pressure in the chamber 28 rises to the level needed to move the piston 21 far enough to effect sufficient communication between the inlet and outlet ports of the relay valves to raise the pressure at their outlet ports, and hence at the brake actuators 15, to a magnitude sufficient to take up the slack in the trailer brakes and condition them for immediate application by the delivery of higher pressure to their actuators.

The opening of the solenoid valve 35 also instantly "primes" the trailer portion of the service line since it is also unrestrictably communicated with the service port 29 of both relay valves. Lag in the manifestation at the trailer end of the service line of whatever pressure obtains at the tractor end thereof, is thus eliminated; and since that pressure depends upon the extent to which the brake pedal is depressed, it follows that the application of the trailer brakes is synchronized both in time and extent with the application of the tractor brakes. The exact pressure required to take up all slack in the trailer brakes and to "prime" the service line will vary with different trailers, but seldom exceeds 5 to 6 p.s.i., unless the brakes are badly worn, in which event that pressure may have to rise to 10 p.s.i. Even then, the trailer brakes are conditioned for concomitant application with the tractor brakes in 0.015 to 0.20 of a second.

The adjustable fluid pressure responsive actuator 44 of the switch 43 is connected by means of a duct 45 with the line 36 leading from the valve 35 to the service port 29 of the relay valves, at a point 46 between the valve 35 and the service ports 29. The actuator 44 is set to open the switch at a pressure somewhat higher — as, for instance, 2 or 3 pounds higher than the pressure required to initiate opening of the relay valves. Accordingly, the energizing circuit for the solenoid 37 is broken and the valve 35 returns to its normally closed state the instant the pressure at said point 46 in the line 36 slightly exceeds that at which initial opening of the relay valve occurs. The consequent reclosure of the valve 35 at that instant commits further response of the relay valves and the resulting application of the trailer brakes to the brake-pedal-actuated control valve 5 before the trailer brakes can lock.

Release of the brakes is entirely conventional and in nowise affected by this invention.

The connection of the switch actuator 44 with the line 36 at a point between the valve 35 and the service port 29 of the relay valves is important since the pressure at that point is truly indicative of the pressure in the service line and in the pressure chamber of the relay valves. Hence, by using the pressure at that location, the valve 35 recloses and "turns over" to the operator-actuated brake pedal 6, the control of the trailer brakes the instant the slack in the trailer brakes is taken up, and hence before the trailer brakes begin to grab. This is, of course, necessary if the operator is to have reliable control of all of the brakes, both tractor and trailer.

The recent adoption of more stringent safety standards has led to the incorporation in tractor-trailer brake systems of automatic anti-wheel-lock controls. These controls are sophisticated instrumentalities that sense the tendency of wheels to lock and, in response to that sensed information, release some of the pressure air in the brake actuators 15 of the wheels on at least one of the two rear axles of the trailer. If that pressure-release takes place between the relay valve and the brake diaphragm, which is usually done by opening an electrically controlled valve 47 at the outlet port 24 of the relay valve, there is no need for in anywise modifying the system from that as described. In other words, the system is entirely compatible with that adaptation of the anti-wheel-lock feature.

However, a recently announced school of thought advocates locating the pressure relieving valve 47 ahead of or at the service port 29 of the relay valves. If that is done, the pressure at the point 46 would be affected, and a pressure reduction here, in the absence of means to prevent it, could result in reclosure of the switch 43 while the brake light switch 40 is still closed. Reclosure of the switch 43 at that time would re-energize the solenoid 37 and reopen the valve 35; and if that happened, the anti-wheel-lock control would be overridden and defeated. To guard against that objectionable consequence, the duct 45 leading to the pressure responsive actuator 44 of the switch 43 has flow control means 48 incorporated in it, by which communication through the duct into the pressure chamber of the actuator 44 is unrestricted whenever the pressure therein is less than it is at the point 46, but is greatly restricted when the pressure differential is in the opposite direction.

This flow control means can take any conventional form — as, for instance, a leaky check valve — but in any event it prevents reclosure of the switch 43 until the stop light switch 40 opens. That switch, as is customary, has a pressure responsive actuator 51 that is connected with the service line 30 and set to close the stop light switch 40 at a relatively low pressure — usually about 4 p.s.i., so that the brake light circuit is energized practically the instant depression of the brake pedal is initiated; and, of course, this switch remains closed as long as the operator maintains pressure on the pedal.

Since the automatic anti-wheel-lock control forms no part of this invention, it requires no disclosure beyond the diagrammatic indication thereof in the drawing, and of course, it is to be understood that automatic anti-wheel-lock control installations are provided for the wheels of the tractor as well as the trailer, but that fact has no bearing upon this invention.

Those skilled in the art will appreciate that the invention can be embodied in forms other than as herein disclosed for purposes of illustration.

The invention is defined by the following claims.

I claim:

1. In a brake system for vehicles consisting of a tractor and a trailer, said brake system having tractor brakes and trailer brakes, separate fluid pressure responsive actuators for the tractor brakes and for the trailer brakes, two fluid pressure reservoirs, one on the tractor and the other on the trailer, means for pressurizing said fluid pressure reservoirs, manually operable brake-applying control valve means on the tractor having an inlet connected with the fluid pressure reservoir on the tractor and outlet means connected with the fluid pressure responsive actuators of the tractor brakes and with a service line that leads to and has an end on the trailer, electric circuit means having a part thereof on the tractor and another part thereof on the trailer, and means activated concomitantly with brake-applying actuation of said control valve means for energizing said electric circuit means by connecting it with a source of current, improved means for reducing lag in the application of the trailer brakes to an inconsequential time interval after brake-applying actuation of said manually operable control valve means, comprising the combination of:

A. a relay valve on the trailer having an inlet port connected with the fluid pressure reservoir on the trailer, and outlet port means connected with the fluid pressure responsive actuators for the trailer brakes, said relay valve having a pressure chamber with a service intake port at all times unrestrictedly connected with said end of the service line, one wall of said pressure chamber being movable and biased to a position communicating the outlet port means of the relay valve with atmosphere, and movable away from said position in response to fluid pressure of a predetermined magnitude in said pressure chamber to disrupt communication of said outlet port means with atmosphere and establish communication between the outlet port means and the inlet port of the relay valve and hence with the fluid pressure reservoir on the trailer sufficient to cause the fluid pressure responsive actuators for the trailer brakes to take up the slack in the trailer brakes;

B. duct means communicating the service intake port of the pressure chamber and the end of the service line that is at all times unrestrictedly connected thereto with the fluid pressure reservoir on the trailer;

C. a normally closed valve in said duct means so placed therein that upon the opening of said valve both said pressure chamber and said end of the service line are directly connected with the fluid pressure reservoir on the trailer;

D. solenoid means operatively connected with said normally closed valve operable upon being energized to effect opening of said valve;

E. electrically conductive means including a normally closed switch for connecting said solenoid means with said electric circuit means so that the instant said electric circuit means is connected with its source of current said normally closed valve is opened and by such opening the pressure chamber of the relay valve and the adjacent portion of the service line is pressurized;

F. fluid pressure responsive switch actuating means operatively connected with said normally closed switch to open the same when the pressure at said switch actuating means exceeds a predetermined magnitude; and G. fluid conducting means communicating said fluid pressure responsive switch actuating means with said duct means at a point therein that lies between said normally closed valve and the service intake port of said relay valve so that the pressure to which said fluid pressure responsive switch responds is that which obtains in the pressure chamber of the relay valve and said end of the service line.

2. The brake system of claim 1, further characterized by:

flow control means in said fluid conducting means of paragraph (G), operable to permit unrestricted flow of pressure fluid to said fluid pressure responsive switch actuating means when the pressure thereat is less than it is at said point in said duct means and to significantly restrict flow from said fluid pressure responsive switch actuating means when the pressure thereat is greater than it is at said point in said duct means.

3. The brake system of claim 1, wherein said electric circuit means is energized in response to fluid pressure in said service line of a predetermined magnitude, wherein said fluid pressure responsive switch actuating means of paragraph F is set to respond to pressure greater than that at which the electric circuit means is energized but less than that at which the trailer brakes are engaged, and further characterized by:

flow control means in said fluid conducting means of paragraph (G) between said fluid pressure responsive switch actuating means of paragraph (F) and said point in said fluid conducting means to restrict flow of pressure fluid from said pressure responsive switch actuating means and thereby prevent reclosure of said normally closed switch until the pressure in the service line drops below the valve at which said electric circuit means is energized.

* * * * *